United States Patent
Park et al.

(10) Patent No.: US 10,452,427 B2
(45) Date of Patent: *Oct. 22, 2019

(54) METHOD AND APPARATUS FOR SWITCHING TASKS USING A DISPLAYED TASK STACK

(71) Applicant: Samsung Electronics Co., Ltd., Gyeonggi-do (KR)

(72) Inventors: Youngjoo Park, Gyeonggi-do (KR); Sehwan Park, Gyeonggi-do (KR); Minjeong Kang, Gyeonggi-do (KR); Jinhee Choi, Gyeonggi-do (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/790,485

(22) Filed: Oct. 23, 2017

(65) Prior Publication Data

US 2018/0046498 A1     Feb. 15, 2018

Related U.S. Application Data

(63) Continuation of application No. 13/729,852, filed on Dec. 28, 2012, now Pat. No. 9,798,579.

(30) Foreign Application Priority Data

Dec. 28, 2011  (KR) .......................... 10-2011-0144975

(51) Int. Cl.
   *G06F 9/48*  (2006.01)
   *G06F 3/0483*  (2013.01)

(52) U.S. Cl.
   CPC .......... *G06F 9/4843* (2013.01); *G06F 3/0483* (2013.01)

(58) Field of Classification Search
   None
   See application file for complete search history.

(56) References Cited

U.S. PATENT DOCUMENTS

| 5,142,684 A | 8/1992 | Perry et al. |
| 5,694,603 A | 12/1997 | Reiffin |

(Continued)

FOREIGN PATENT DOCUMENTS

| CN | 1368688 | 9/2002 |
| CN | 101042660 | 9/2007 |

(Continued)

OTHER PUBLICATIONS

First Office Action dated Jul. 4, 2018 in counterpart Chinese Patent Application No. 201710897887.2 and English-language translation.

(Continued)

*Primary Examiner* — Van H Nguyen

(74) *Attorney, Agent, or Firm* — Nixon & Vanderhye, P.C.

(57) ABSTRACT

A method and an electronic device are provided in which, in response to a first user input, a stack of partially overlaid visual elements is displayed in response to the first user input. Each visual element corresponds to an application that is running in the electronic device and includes an index item representing the corresponding application. A second user input for selecting a visual element from the stack of partially overlaid visual elements is received through the touchscreen. An execution screen of an application corresponding to the selected visual element is displayed.

12 Claims, 6 Drawing Sheets

(56) References Cited

U.S. PATENT DOCUMENTS

| | | |
|---|---|---|
| 6,005,575 A | 12/1999 | Colleran et al. |
| 6,205,468 B1 | 3/2001 | Diepstraten et al. |
| 6,243,736 B1 | 6/2001 | Diepstraten et al. |
| 6,260,150 B1 | 7/2001 | Diepstraten et al. |
| 6,831,666 B1 | 12/2004 | Kreis |
| 6,986,141 B1 | 1/2006 | Diepstraten et al. |
| 7,159,189 B2 | 1/2007 | Weingart |
| 7,444,641 B1 | 10/2008 | Diepstraten et al. |
| 8,266,521 B2 | 9/2012 | Sung |
| 8,510,743 B2 | 8/2013 | Hackborn |
| 8,595,645 B2 * | 11/2013 | Boettcher ............ G06F 3/04883 715/702 |
| 8,930,846 B2 * | 1/2015 | Sirpal .................. G06F 1/1616 715/790 |
| 9,471,217 B2 * | 10/2016 | Shin ...................... G06F 3/0482 |
| 2004/0255254 A1 | 12/2004 | Weingart et al. |
| 2007/0226747 A1 | 9/2007 | Kobayashi |
| 2008/0052717 A1 | 2/2008 | Lee |
| 2008/0072146 A1 | 3/2008 | Sung |
| 2008/0168454 A1 | 7/2008 | Choi et al. |
| 2008/0204424 A1 | 8/2008 | Jin et al. |
| 2009/0113444 A1 | 4/2009 | Hackborn |
| 2009/0158212 A1 | 6/2009 | Dykstra-Erickson et al. |
| 2009/0217198 A1 | 8/2009 | Jung |
| 2009/0227279 A1 | 9/2009 | Yuki et al. |
| 2009/0293007 A1 | 11/2009 | Duarte et al. |
| 2010/0066698 A1 | 3/2010 | Seo |
| 2010/0182248 A1 | 7/2010 | Chun |
| 2010/0299597 A1 | 11/2010 | Shin et al. |
| 2011/0080359 A1 | 4/2011 | Jang et al. |
| 2011/0185396 A1 | 7/2011 | Ohta et al. |
| 2011/0202872 A1 | 8/2011 | Park |
| 2011/0225492 A1 * | 9/2011 | Boettcher ............ G06F 3/0485 715/702 |
| 2011/0320977 A1 | 12/2011 | Bahn et al. |
| 2012/0311432 A1 | 12/2012 | Sung |

FOREIGN PATENT DOCUMENTS

| | | |
|---|---|---|
| CN | 101216785 | 7/2008 |
| CN | 101236558 | 8/2008 |
| CN | 101676853 | 3/2010 |
| EP | 1 416 368 | 5/2004 |
| JP | 4611000 | 1/2011 |
| KR | 1020040110116 | 12/2004 |
| KR | 20080039642 | 5/2008 |
| KR | 100904233 | 6/2009 |
| KR | 10-2010-0084905 | 7/2010 |
| KR | 10-2011-0124440 | 11/2010 |
| KR | 10-2011-0037761 | 4/2011 |
| WO | 2009/143075 | 11/2009 |
| WO | WO 2009/143076 | 11/2009 |

OTHER PUBLICATIONS

European Search Report dated Jun. 30, 2015 issued in counterpart application No. 12862636.3-1954, 7 pages.

Notification of Granting of Patent Right dated Sep. 19, 2018 in counterpart Chinese Patent Application No. 201710897887.2 and English-language machine translation thereof.

Office Action dated Oct. 15, 2018 in counterpart Korean Patent Application No. 10-2011-0144975 and and English-language machine translation thereof.

* cited by examiner

METHOD AND APPARATUS FOR SWITCHING TASKS USING A DISPLAYED TASK STACK

PRIORITY

This application is a Continuation Application of U.S. application Ser. No. 13/729,852, filed in the U.S. Patent and Trademark Office (USPTO) on Dec. 28, 2012, now U.S. Pat. No. 9,798,579, which claims priority under 35 U.S.C. § 119(a) to a Korean patent application filed on Dec. 28, 2011 in the Korean Intellectual Property Office and assigned Serial No. 10-2011-0144975, the contents of which are incorporated herein by reference.

BACKGROUND OF THE INVENTION

1. Field of the Invention

The present invention relates generally to a multitasking method and apparatus of a user device and, in particular, to a multitasking method and apparatus of a user device that is capable of intuitively and swiftly switching between background and foreground tasks running on the user device.

2. Description of the Related Art

Communication and information processing on the move is a fundamental feature of portable user devices such as a cellular phone, Personal Digital Assistant (PDA), electronic organizer, and tablet Personal Computer (PC). Newer user devices also incorporate various features such as data communication including video as well as basic voice and text communication, an electronic organizer, a camera, email, broadcast play, Internet access, audio playback, a scheduler, Social Networking Service (SNS), a messenger, a dictionary, and gaming. These features can be embedded at the user device manufacturing stage or added in the form of applications downloaded by the user.

Such applications can be running on the user device simultaneously based on the multitasking function supported by the user device. That is, the user device supporting the multitasking function is capable of simultaneously processing multiple tasks. In such a case, the user device displays the execution screen of the application selected by the user among the applications running simultaneously while other applications are running on the background without display of all their execution screens. Typically, the task-switching is from the task on the top layer (e.g. application running on the foreground with the presentation of its execution screen on the display unit) to another task (e.g. application running on the background) is made in such a manner that the execution screen of the foreground-running main task is replaced by a list of all tasks running currently in the user device and then the task selected by the user from the list becomes the main task with the presentation of its execution screen.

In order to check all of the applications running in the user device or switch the main task from the application running on the foreground to one of the applications running on the background, the user has to terminate the main task or manipulate the main task to be running on the background with the presentation of the task list so as to select a new main task from the task list, resulting in cumbersome manipulation. That is, the conventional task-switching mechanism of the portable user device lacks intuitiveness, resulting in user inconvenience. There is therefore a need of a method for facilitating a convenient switch among multiple tasks running on a user device.

SUMMARY OF THE INVENTION

The present invention has been made in an effort to solve the above problems and it is an object of the present invention to provide a multitasking method and apparatus of a user device that is capable of facilitating multitasking function.

It is another object of the present invention to provide a multitasking method and apparatus of a user device that is capable of intuitively and quickly switching among the tasks of the multiple applications running on the user device.

It is still another object of the present invention to provide a multitasking method and apparatus of a user device that is capable of facilitating switch between tasks of the multiple applications running on the device with reduced manipulation steps and simplified interaction.

In accordance with an aspect of the present invention, electronic device is provided that includes a touchscreen, a memory, and a processor electrically connected with the touchscreen and the memory. The memory stores instructions that cause, when executed, the processor to, in response to a first user input, control the touchscreen to display a stack of partially overlaid visual elements in response to the first user input, each visual element corresponding to an application that is running in the electronic device and including an index item representing the corresponding application. The processor is also caused to receive a second user input for selecting a visual element from the stack of partially overlaid visual elements through the touchscreen, and control the touchscreen to display an execution screen of an application corresponding to the selected visual element.

In accordance with another aspect of the present, a multitask management method of an electronic device is provided. In response to a first user input, a stack of partially overlaid visual elements is displayed in response to the first user input. Each visual element corresponds to an application that is running in the electronic device and includes an index item representing the corresponding application. A second user input for selecting a visual element from the stack of partially overlaid visual elements is received through the touchscreen. An execution screen of an application corresponding to the selected visual element is displayed.

In accordance with still another aspect of the present invention, a non-transitory computer-readable medium is provided that stores instructions that, when executed by one or more processors, cause the one or more processors to perform operations including, in response to a first user input, displaying a stack of partially overlaid visual elements in response to the first user input, each visual element corresponding to an application that is running in the electronic device and including an index item representing the corresponding application. The one or more processors also receive a second user input for selecting a visual element from the stack of partially overlaid visual elements through the touchscreen, and display an execution screen of an application corresponding to the selected visual elements.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE INVENTION

Embodiments of the present invention are described with reference to the accompanying drawings in detail. The same reference numbers are used throughout the drawings to refer to the same or like parts. Detailed description of well-known functions and structures incorporated herein may be omitted for the sake of clarity and conciseness.

The present invention discloses a method and apparatus for facilitating switch among the tasks in the user device supporting multitasking. When an input for switching among the tasks of multiple applications running on the user device supporting multitasking is detected, the user device presents a stack of the tasks in process to facilitate switching among the tasks. The multitasking method and apparatus of the present invention is capable of facilitating switching from the current task to another task.

The configuration of the user device and multitasking method of the user device is described hereinafter with reference to accompanying drawings. However, the present invention is not limited to the following description on the configuration of the device and multitasking method thereof but can be implemented in alternative embodiments.

Figure 1:
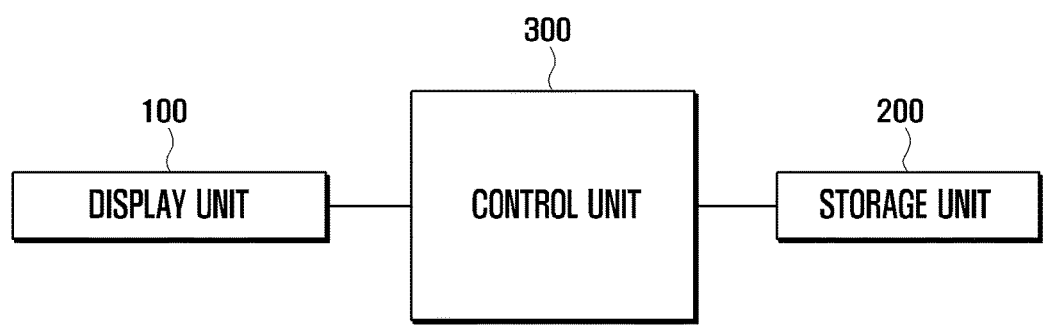
FIG. 1 illustrates a configuration of the user device according to an embodiment of the present invention.

FIG. 1 illustrates a configuration of the user device according to an embodiment of the present invention.

As shown in FIG. 1, the user device includes a display unit 100, a storage unit 200, and a control unit 300. Although not depicted in FIG. 1, the user device may further include at least one of an audio processing unit with a microphone and a speaker, a digital broadcast module for receiving digital broadcast (e.g. Digital Multimedia Broadcasting (DMB) and Digital Video Broadcasting (DVB)) signals, a camera module for taking still and motion pictures, a short range communication module for supporting short range radio communication (such as Bluetooth, Infrared Data Association (IrDA), Radio Frequency Identification (RFID), and Near Field Communication (NFC)), an input unit for receiving hard key-based input, a Radio Frequency (RF) module for supporting cellular voice and video and data communications, an internet access module for supporting Internet Protocol (IP) based Internet service, a location information collection unit for collecting location information of the user device, and a battery for supplying power to the above components.

The display unit 100 is capable of displaying operation-related screens of the user device, such as a menu screen and execution screens of applications. The display unit 100 can be implemented with one of Liquid Crystal Display (LCD), Light Emitting Diode (LED), Organic LED (OLED), and Active Matrix OLED (AM OLED). The display unit 100 can be provided with a touch-based input interface. For example, the display unit 100 is equipped with a touchscreen to generate an input signal to the control unit 300 in response to a touch input of the user. The display unit 100 is also capable of supporting display mode switching function for switching between the portrait view mode and the landscape view mode according to the orientation of the user device.

Particularly, the display unit 100 is capable of providing a task-switching region for supporting the task-switching function in the multitasking mode in which multiple applications are running in the user device. The display unit 100 is capable of receiving a touch interaction for switching through the task-switching region, and providing a task-switching user interface showing a stack of the tasks in response to a touch interaction under the control of the control unit 300. The display unit 100 displays the execution screen of the application corresponding to the task at the top of the stack along with an image of the stack of the tasks having respective executions screens in part or application identity information. The display unit 100 is capable of displaying the stack that is re-sized according to the number of currently running tasks. The proceeding will describe the screen configuration with reference to screen images.

The storage unit 200 stores various applications and data executable in the user device and can include at least one of non-volatile and volatile memories. In an embodiment of the present invention, the storage unit 200 includes at least one of Read Only Memory (ROM), flash memory, Random Access Memory (RAM), internal Hard Disk Drive (HDD), external HDD, and other external storage media. The storage unit 200 is capable of persistently or temporarily storing the Operating System (OS) of the user device, the programs and data related to the display control operation of the display unit 100, the display unit-assisted input operation control, the user device function control, and the task-switching function control. The storage unit 200 is capable of storing configuration information related to the multitasking operations. The configuration information is capable of including stack display modes dependent on the touch interaction for task-switching and screen display modes of the task dependent on the touch interaction.

The control unit 300 controls overall operations of the user device. Particularly, the control unit 300 is capable of controls the task-switching operation in association with the users' touch interaction in the multitasking mode. For example, the control unit 300 is capable of processing multiple tasks corresponding to the application running in the multitasking mode. The control unit 300 is also capable of detecting the touch interaction made at the task-switching region, when the execution screen of an application is displayed on the display unit 100, and presenting all tasks corresponding to the currently running applications in the form of a stack.

The control unit 300 is capable of re-sizing the stack according to the number of tasks. For example, the control unit 300 compares the number of the tasks with a threshold (e.g. 5) and re-sizes the width of the task window on top of the stack according to the comparison result to rearrange the subsequent task windows at an interval.

The control unit 300 is capable of switching among the tasks in response to the users' touch interaction made When the task windows are presented in the form of a stack and displaying the switching result screen. For example, the control unit 300 is capable of discriminating among a sequential task selection for selecting the tasks one by one from the stack, a direction task selection for selecting a specific task directly from the stack, and a focused task selection for selecting a task while navigating across the tasks of the stack. The sequential task selection, direct task selection, and focused task selection will be described in detail herein.

The control unit 300 is capable of controlling the switching to the task of the application and the display of the switched task screen according to the task selection mode. For example, the control unit 300 is capable of controlling displaying the execution screen of the application corresponding to the switched task in the full screen mode or in the form of a task window stacked on top of the stack.

The control unit 300 is capable of controlling the operations related to the normal functions of the user device as well as the aforementioned functions. For example, the control unit 300 is capable of controlling execution of a specific application and display of the execution screen, controlling the receipt of various users' touch interaction inputs supported by the touch-based input interface and operation corresponding to the touch interaction, and controlling the wired and/or wireless data communication of the user device.

The user device depicted in FIG. 1 can be any of information communication devices, multimedia devices, and their equivalents supporting the multitasking function. The user device can be any type of devices including a mobile communication terminal operating over a communication protocol, a tablet PC, a smartphone, a digital camera, Portable Multimedia Player (PMP), a media player, a portable game console, a laptop computer, and a PDA. The function control method is applicable to various display-equipped devices such as digital television (TV), Digital Signage (DS), and Large Format Display (LFD).

Figure 2:
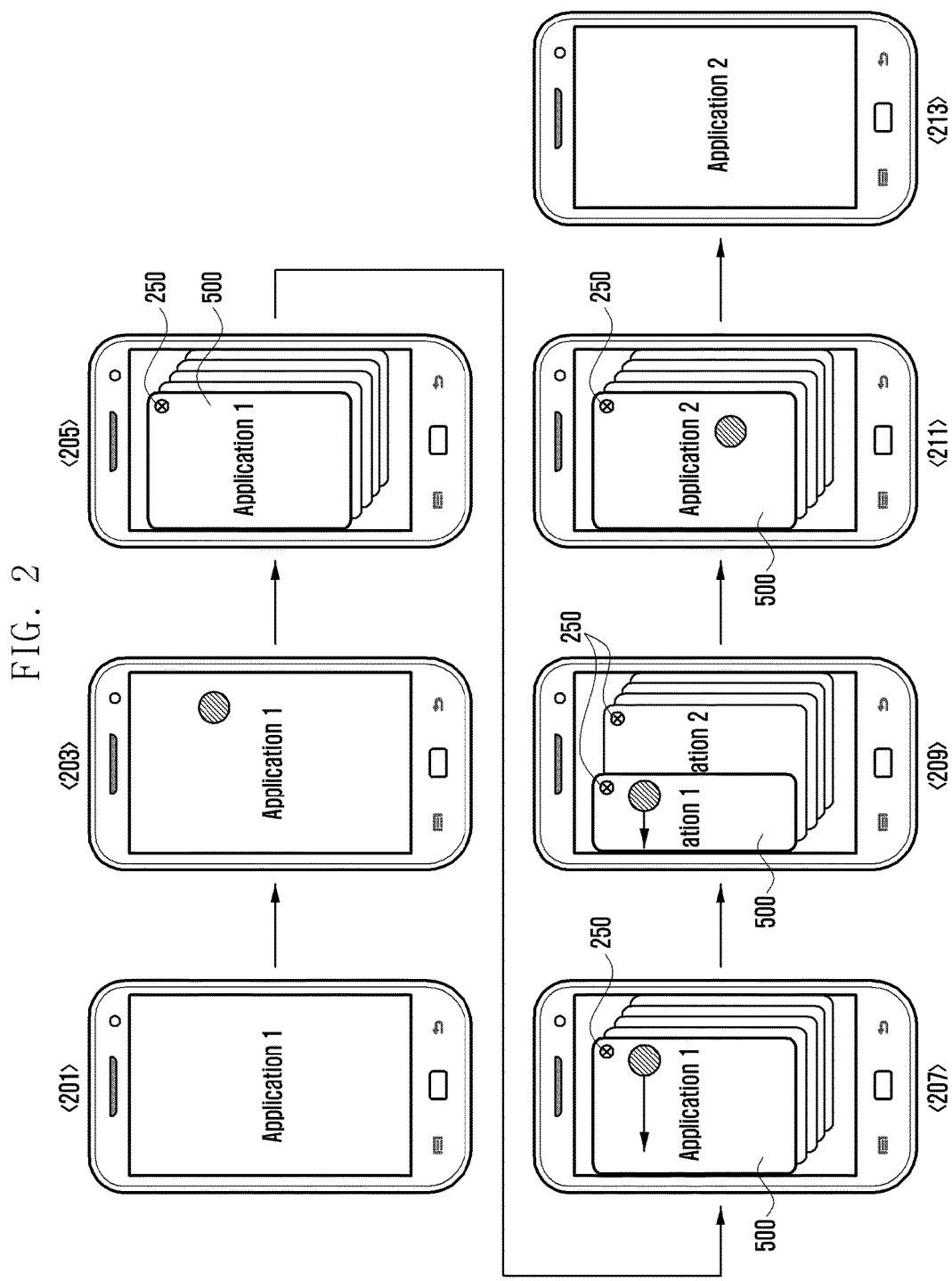
FIG. 2 illustrates screen displays presented in the task-switching operation of the user device according to an embodiment of the present invention.

FIG. 2 illustrates screen displays presented in the task-switching operation of the user device according to an embodiment of the present invention. Particularly, FIG. 2 is directed to the task-switching method based on the sequential task selection.

In FIG. 2, it is assumed that a specific application (e.g. Application 1) is executed with the display of its execution screen as denoted by reference number 201. Although only one execution screen is presented, it is assumed that multiple applications are running on the background. That is, multiple tasks of the applications running in the multitasking mode are handled simultaneously.

In the state of screen display 201, the user can make a touch interaction calling the task stack for executing the task-switching function (hereinafter, stack calling interaction) at a region on the screen as denoted by reference number 203. The region can be the task-switching region designated for the task-switching function. The task-switching region can be defined at a side (e.g. right end) of the screen to minimize interference to other normal function execution with the touch interaction on the execution screen. The stack calling interaction can be a touch & hold interaction that temporarily holds the touch or a tap interaction that makes a contact and immediately releases the contact. In the case of the touch & hold interaction, the touch may be released or maintained after calling the stack. In the case of the sequential task selection or focused task selection mode to be displayed later, the touch can be maintained while navigating across the tasks of the stack. In the case of the direct task selection mode, however, the next task can be selected by releasing the touch interaction mode on the current task and making another touch interaction on another target task.

If the stack calling interaction is made as shown in the screen 203, a stack of the tasks that are currently running in the user terminal is displayed as denoted by reference number 205. The stack is generated by accumulating the application execution windows of the corresponding stack to the respective tasks, such as stack images of respective windows as captured execution screens, still images, or snap images. Particularly, the tasks are fetched and are a rendered resource on the allocated window area, and the rendered resource is provided at least one image of the application execution windows. That is, the stack is a rendered image of the application execution windows associated with an individual task. The application execution windows can be stacked in a stepwise manner as shown in the screen display 205. The stack of the execution windows can be re-sized according to the number of currently running tasks. For example, the stacked execution windows can be narrowed or widened in width according to the number of the currently running tasks.

When the task stack is presented in response to the stack calling interaction as shown in the screen display 205, the user is capable of making a touch interaction for dragging the touch from one point (e.g. on the execution window of the task of Application 1) to another (e.g. drag to the left) as shown in the screen display 207. The task-switching interaction can be made in the form of a flicking, dragging, moving, or sweeping gesture interaction.

If a touch is made for inputting the task-switching interaction and then moved in a specific direction (e.g. left) as shown in the screen display 207, the execution window on top of the stack 500 slides left so as to be replaced by the execution window of the next top task (e.g. Application 2) as shown in the screen display 209. This operation can be performed with a fade-in/fade-out effect.

If the user releases the touch to complete the task-switching interaction to the left in the state of screen display 209, the switching is completed such that the task of the next highest order (e.g. Application 2) appears on top of the stack 500 as shown in the screen display 211. The task (e.g. Application 1) disappeared from the top of the stack 500 is arranged at the bottom of the stack.

When the tasks are rearranged as shown in the screen display 211, the switching can be performed again as described above in response to another task-switching interaction made by the user. In the state of the screen 211, the user is capable of terminating the task-switching procedure by inputting a touch interaction. For example, the user is capable of making a task-switching termination interaction by releasing the touch held over a time duration when the new highest order application (e.g. Application 2) is arranged on top of the stack 500 as shown in the screen display 211. If the task-switching operation is completed the execution window of the application arranged on top of the stack 500 is presented in the full screen mode as shown in the screen display 213.

When all of the currently running tasks are displayed in the form of a stack in response to the stack calling interaction, the execution window of each task can be presented along with a task termination item 250 at a side of the window. The task termination item 250 can be provided optionally to improve the task management convenience on the screen presenting the stack of the tasks. Using this optional item, the user can manage each of the currently running tasks intuitively and quickly. For example, if the user selects the task input item 250 on the screen 207 of FIG. 2, the task (i.e. task of Application 1) corresponding to the task execution window on the top of the stack 500 is terminated with the disappear of the task execution window. The remaining task execution windows can be rearranged on the stack. For example, the task execution windows are rearranged at an interval.

Figure 3:
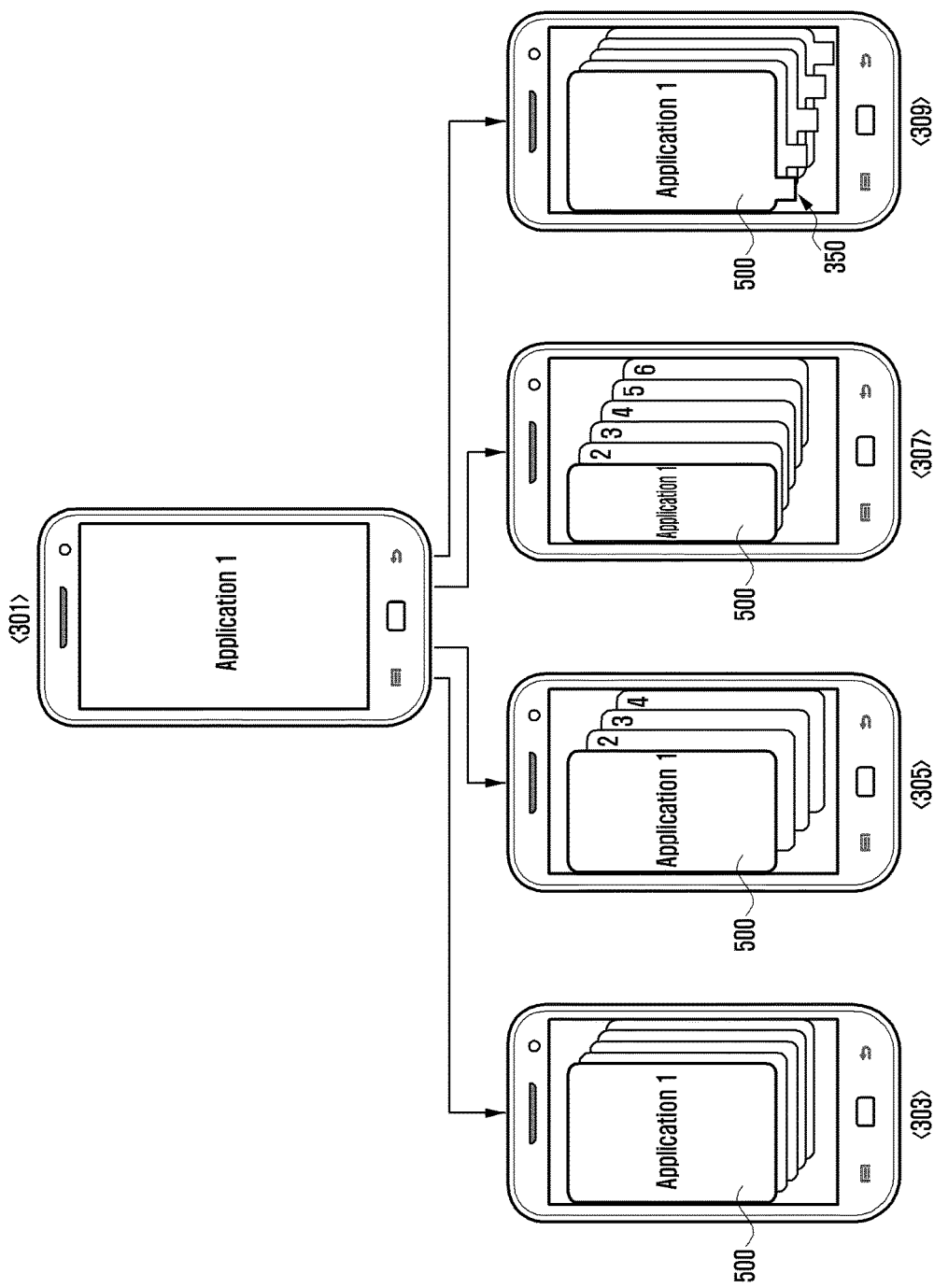
FIG. 3 illustrates screen displays presented in the task-switching operation of the user device according to another embodiment of the present invention.

FIG. 3 illustrates screen displays presented in the task-switching operation of the user device according to another embodiment of the present invention.

In FIG. 3, it is assumed that a specific application (e.g. Application 1) is running with display of its execution screen as denoted by reference number 301. Although only one execution screen is presented, it is assumed that multiple applications are running on the background. That is, multiple tasks of the applications running in the multitasking mode are handled simultaneously.

In the state of screen display 301, the user can make a touch interaction calling the task stack for executing the task-switching function (hereinafter, stack calling interaction) at a task-switching region.

In response to the stack calling interaction, the user terminal is capable of generating the stack of tasks corresponding to the currently running application and presenting the stack on a task-switching user interface. The task-switching user interface includes the stack of execution windows of the currently running application that are stacked in stepwise manner such that the user can make the sequential task selection, direct task selection, or focused task selection. The stack is generated by accumulating the application execution windows of the corresponding stack to the respective tasks, such as stack images of respective windows as captured execution screens, still images, or snap images. Particularly, the tasks are fetched and are a rendered resource on the allocated window area, and the rendered resource is provided at least one image of the application execution windows. That is, the stack is a rendered image of the application execution windows associated with an individual task. Hereinafter, the stack corresponding to the execution window will be referred to as stack image.

The task-switching user interface can be provided in various types as denoted by reference numerals 303, 305, 307, and 309 according to the user configuration.

For example, the stack of the currently running tasks is presented as shown in the screen display 303 in response to the touch interaction input. In the screen display 303, the execution screen image of the application (e.g. Application 1) which is captured right before the input of the stack calling interaction is arranged on top of the stack 500 with the other applications' execution stack images accumulated in a stepwise manner. The stack images of other applications are shown with no meaning information. The stack images of the other applications can be the execution window images of the corresponding applications.

As shown in the screen displays 305 and 307, the stack images of the application execution screens can be provided in a stepwise manner. In the screen displays 305 and 307, the stack images are stacked at different intervals such that the exposed margins of the stack images below the top ones differ in the two screen displays. In the screen displays 305 and 307, an application identification item can be provided at the exposed margin of each stack image below the top stack image. For example, the stack image of the Application 1 is presented on top of the stack 500 while the stack images of Application 2, Application 3, and Application 4 are arranged there below along with the items identifying the applications (e.g. numbers 2, 3, 4, 5, and 6 as shown at the margins of the accumulated stack images. The item for identifying the application can be a part of the stack image of the application execution screen, a thumbnail image of application execution screen, or an icon or a text representing the corresponding application.

As shown in the screen displays 305 and 307, the stack of the stack images, i.e. the application execution window images, can be configured such that the interval between two stack images increases or decreases according to the number of the currently running applications. For example, the screen display 305 is for when total four applications are running while the screen display 307 is for when total 6 applications are running. Particularly, when many applications are running simultaneously (i.e. the number of currently running application is greater than or equal to a threshold), the intervals between stack images are narrowed by decreasing the width of the stack image on top of the stack 500 as shown in the screen display 307. The user can identify the applications intuitively with the stack images below the stack image on top of the stack 500 as well as the stack image on top of the stack 500.

The user terminal is capable of displaying the stack of the stack images in a stepwise manner in response to a touch input as shown in the screen display 309. In the case of the screen display 309, each stack image is provided with a tab as an index item 350 protruded at a side (bottom or right side) of the stack image to enhance the recognition and facilitate switching between applications. The stack image of the application 1 is presented on top of the stack 500 along with the index item 390 protruding below, and the stack images of Applications 2, 3, and 4 are partially exposed below the stack image of Application 1 along with their respective index items 309. The index item 390 can be provided in the form of an application icon or text and can be changed in shape and color according to the user configuration.

Figure 4:
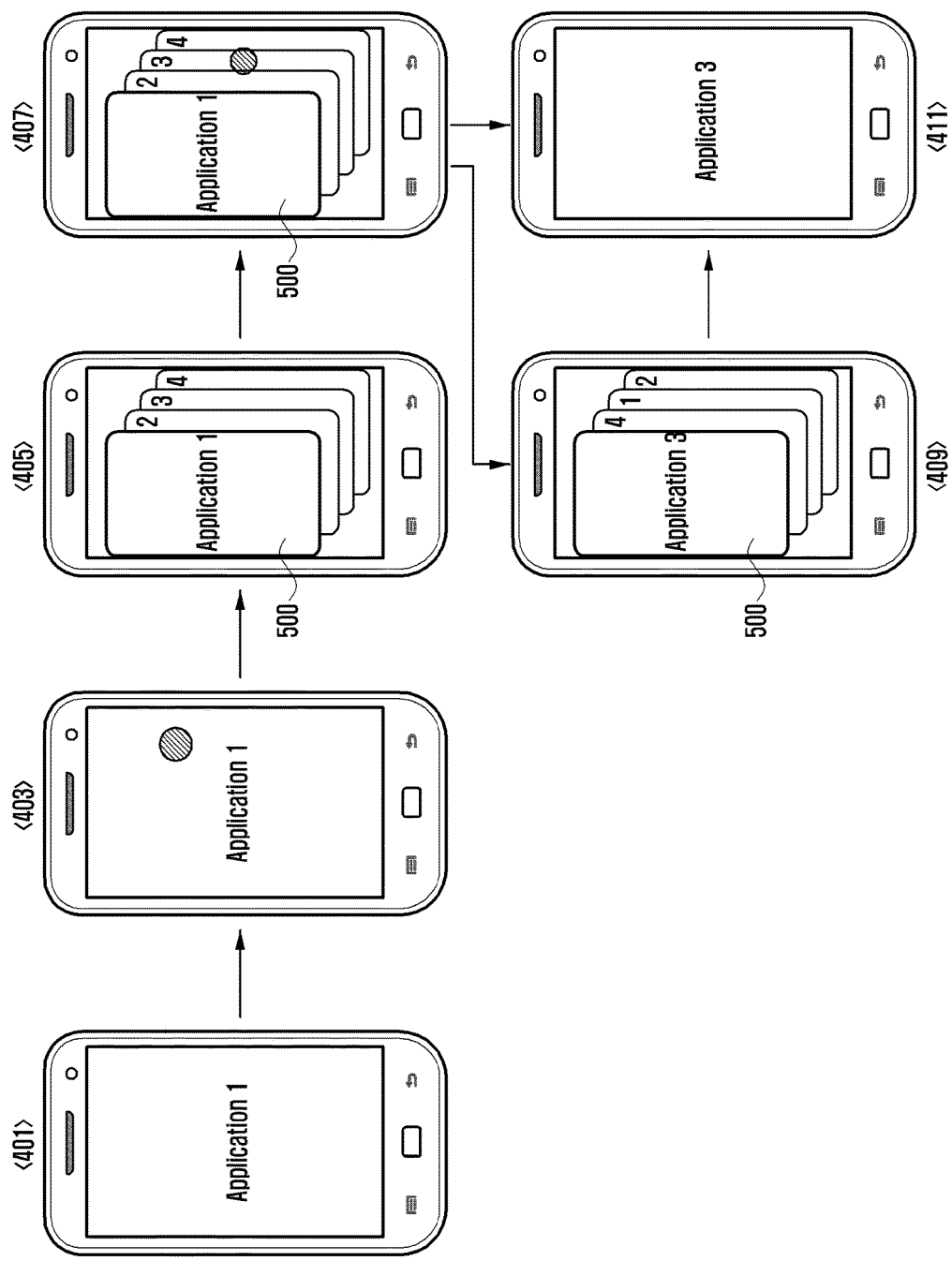
FIG. 4 illustrates screen displays presented in the task-switching operation of the user device according to another embodiment of the present invention.

FIG. 4 illustrates screen displays presented in the task-switching operation of the user device according to another embodiment of the present invention. Particularly, FIG. 4 is directed to the task-switching method based on the direct task selection.

In FIG. 4, it is assumed that a specific application (e.g. Application 1) is executed with the display of its execution screen as denoted by reference number 401. Although only one execution screen is presented, it is assumed that multiple applications are running on the background. That is, multiple tasks of the applications running in the multitasking mode are handled simultaneously.

In the state of screen display 401, the user can input a touch interaction calling the task stack for executing the task-switching function (hereinafter, stack calling interaction) in a task-switching region as shown in the screen display 403.

In response to the stack calling interaction, the user terminal is capable of generating the stack of tasks corresponding to the currently running application and presenting the stack on a task-switching user interface as shown in the screen display 405. The stack of the tasks, i.e. stack images of the application execution screens, is in a stepwise manner as shown in the screen display 405.

The width of each stack image can be re-sized according to the number of the tasks, i.e. the currently running applications. By re-sizing the width of each stack image, it is possible to increase or decrease the distances between stack images. The stack re-sizing can be performed by reducing the width of the stack image on top of the stack 500 and then narrowing the intervals between the stack images below the top stack image.

When the stack of the tasks is called to be presented as shown in the screen display 405, the user can make a touch to select the stack image (selection interaction) corresponding to a target application (e.g. Application 3) as shown in the screen display 407. The selection interaction can be one of a tap interaction a flick interaction, a drag interaction, a move interaction, a sweep interaction, and a touch & hold interaction.

In response to the selection interaction made as shown in the screen display 407, the user device is capable of displaying a screen as shown in the screen display 409 or 411. When the user device is operating in the sequential task-switching mode, the application corresponding to the stack image selected by the user becomes the foreground application such that the selected stack image is presented on top of the stack 500 and the rest stack images are rearranged in order.

The stack images that have been arranged over the selected stack image (e.g. Application 1 and Application 2) are rearranged below the stack image (e.g. Application 4) at the bottom of the stack while maintaining their stacking order. When the user device is operating in the direct task-switching mode, the execution screen of the application corresponding to the selected stack image (e.g. Application 3) is presented in full screen view as shown in the screen display 411.

In the state of the screen display 409, the user can continue task-switching manipulation. The user also can terminate the task-switching operation by making a touch interaction input in the state of screen display 409. For example, the user can make a touch interaction of holding the touch over a time and then releasing the touch (e.g. task-switching release interaction) When the stack image of the selected application (e.g. Application 3) is presented on top of the stack 500 as shown in the screen display 411. In response to the task-switching release interaction, the execution screen of the application (e.g. Application 3) corresponding to the selected stack image presented on top of the stack 500 is displayed in full screen view as shown in the screen display 411.

Figure 5:
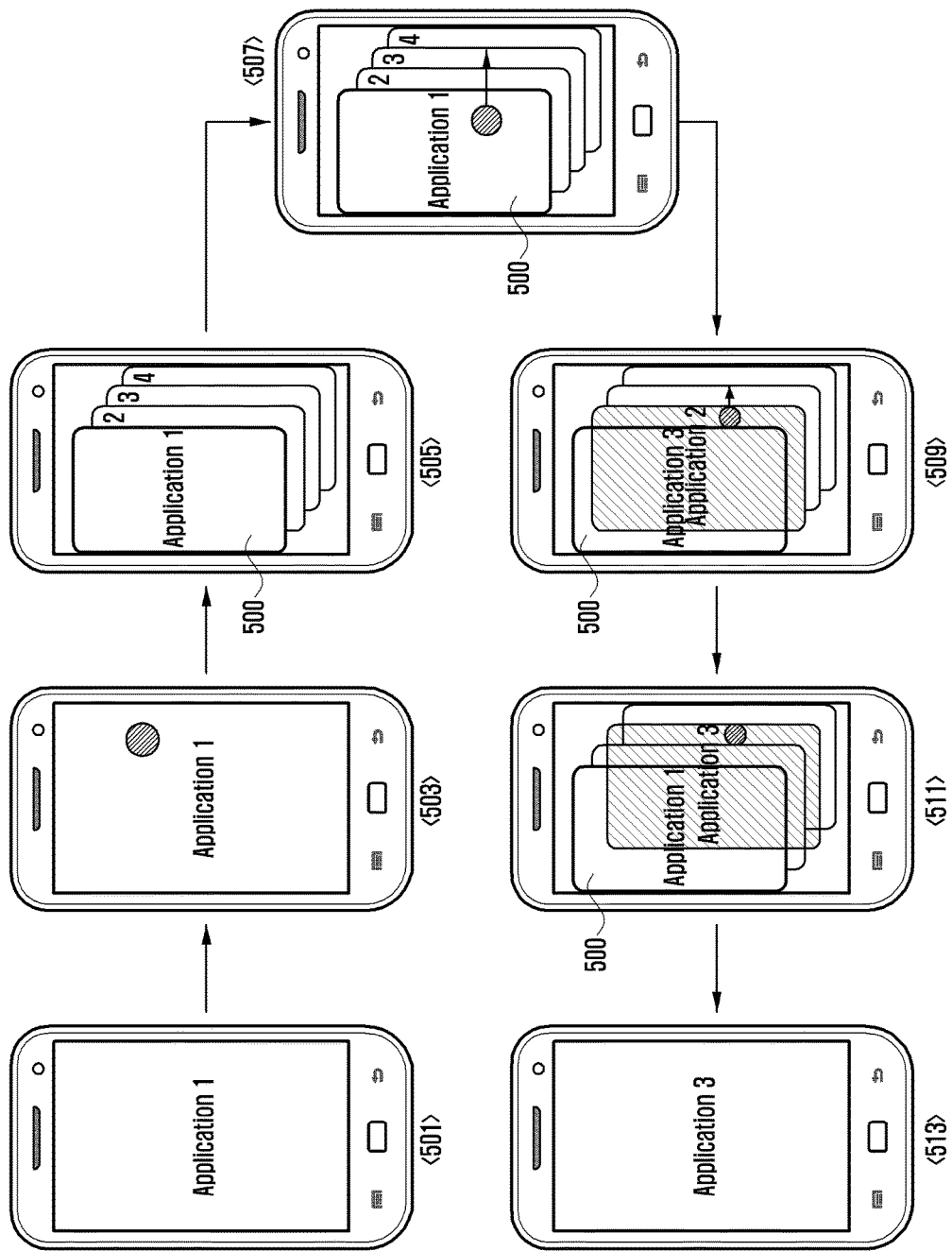
FIG. 5 illustrates screen displays presented in the task-switching operation of the user device according to still another embodiment of the present invention.

FIG. 5 illustrates screen displays presented in the task-switching operation of the user device according to still another embodiment of the present invention. Particularly, FIG. 5 is directed to the task-switching method based on the focused task selection.

In FIG. 5, it is assumed that a specific application (e.g. Application 1) is executed with the display of its execution screen as denoted by reference number 501 and multiple tasks of the applications running in the multitasking mode are handled simultaneously.

In the state of screen display 501, the user can make a touch interaction calling the task stack for executing the task-switching function (hereinafter, stack calling interaction) at a task-switching region as shown in the screen display 503.

In response to the stack calling interaction, the user terminal is capable of displaying the stack of tasks corresponding to the currently running application as shown in the screen display 505. The stack of the tasks, i.e. stack images of the application execution screens, is in a stepwise manner as shown in the screen display 505. Each stack image can be re-sized according to the number of the tasks. By re-sizing the width of each stack image, it is possible to increase or decrease the distances between stack images.

The stack re-sizing can be performed by reducing the width of the stack image on top of the stack 500 and then narrowing the intervals between the stack images below the top stack image.

When the stack of the tasks is called to be presented as shown in the screen display 505, the user can make a touch navigating from a region on the stack image on top of the stack 500 to another on the next stack image such that the stack image on which the touch made is highlighted as shown in the screen displays 507 to 511. The touch interaction can be one of a tap interaction, a flick interaction, a drag interaction, a move interaction, a sweep interaction, and a touch & hold interaction.

For example, the user can make a touch at a region of the stack image on top of the stack 500 and moves the touch to the right contacting other stack images in series as shown in the screen display 507. When navigating across the stack images, a visual effect can be provided such that the stack image at which the touch remains is highlighted as shown in the screen displays 509 and 511. That is, the cursor moves according to the movement of the touch point, focusing the corresponding stack image, so as to enhance the intuitiveness of the user interface. For example, the stack image focused by the passing touch can be highlighted and exposed through the stack images that are arranged above and become transparent as shown in the screen displays 509 and 511. The stack image focused by the passing touch can be highlighted or changed in color without change in arrangement.

In order to select a stack image (e.g. Application 3) in the state of navigating across the stack images as shown in the screen displays 507 to 511, the touch can be released on the target stack image. If the stack image is selected in this manner, the execution screen of the application (e.g. Application 3) corresponding to the stack image is displayed in the full screen view as shown in the screen display 513.

As described above, the multitasking method according to the present invention is capable of selecting a task from the stack of currently running tasks one by one in sequential order as well as directly. The task on which the cursor stays is presented with a specific visual effect (e.g. transparent overlay effect, highlight effect, or colorized effect) to indicate that the corresponding application is selected and, if the touch is released, the selection application is brought to the foreground.

Figure 6:
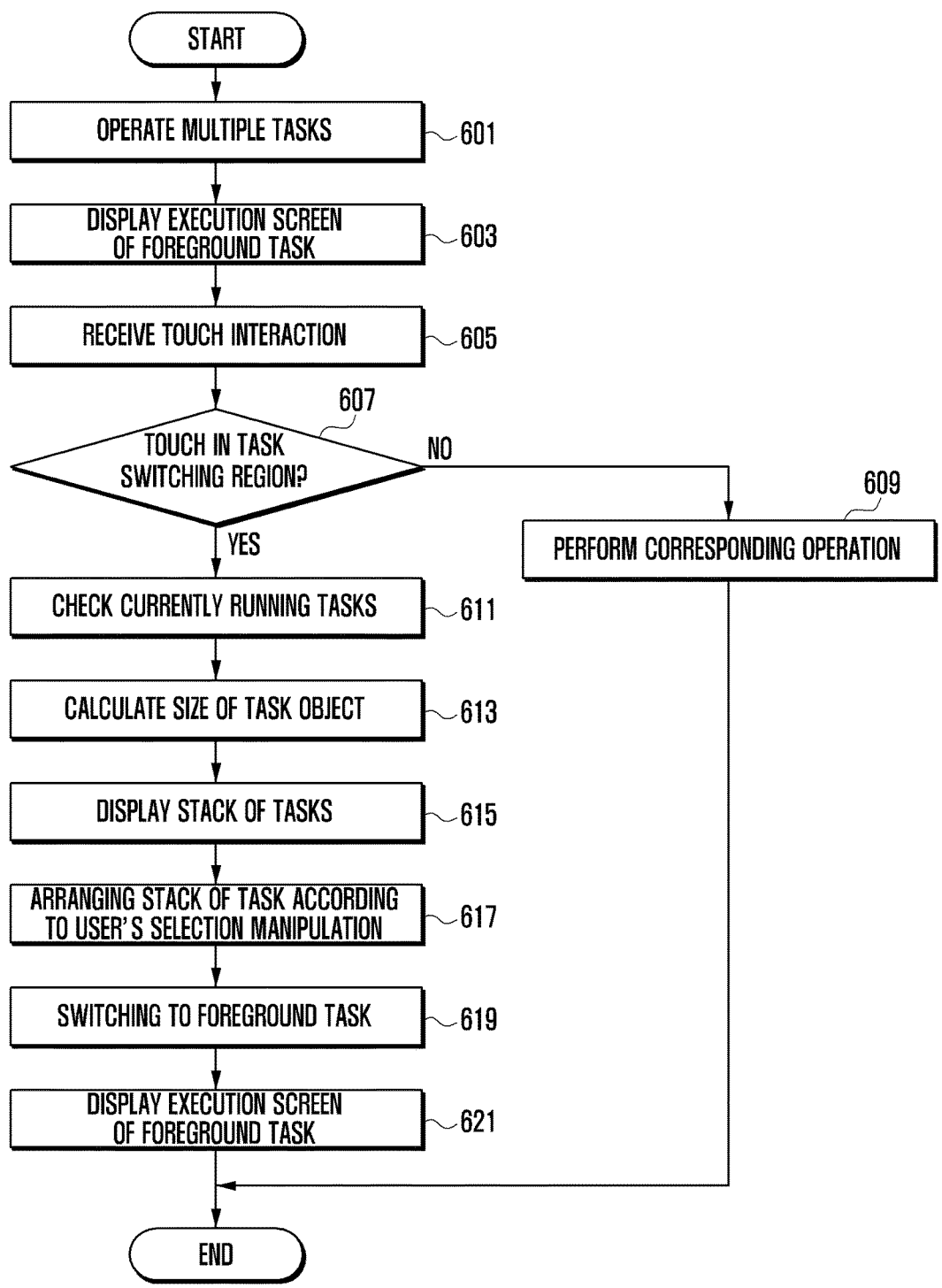
FIG. 6 illustrates a multitasking method of the user device according to an embodiment of the present invention.

FIG. 6 illustrates a multitasking method of the user device according to an embodiment of the present invention.

Referring to FIG. 6, the control unit 300 determines the tasks that are running on the user device currently at step 601, and displays the execution window of the foreground task at step 603. The control unit 300 detects a touch input while the user device is operating in the multitasking mode at step 605.

The control unit 300 determines whether the touch input is made at a task-switching region designated for the task-switching function at step 607.

If the touch input is made out of the task-switching region, the control unit 300 performs the operation corresponding to the touch interaction at step 609. For example, the control unit 300 can control to execute the function corresponding to the item selected by the touch input made on the execution screen of the foreground application.

If the touch input is made at the task-switching region, the control unit 300 determines all of the currently running tasks at step 611. For example, the control unit 300 can count the tasks of all applications running in the multitasking mode of the user device as well as the tasks of the foreground application.

Next, the control unit 300 calculates the size of execution window image representing each task on the stack at step 613. For example, the control unit 300 compares the number of the currently running tasks with a threshold and adjusts the width of the execution window image on top of the stack 500 and the interval between consecutive execution window images on the stack according to the comparison result.

Next, the control unit 300 displays the stack of the currently running tasks as being re-sized according to the calculation result at step 615. As described above, the stack of the currently running tasks can be presented in a stepwise manner on the task-switching user interface.

The control unit 300 can control to display the task selected by the users' touch interaction from the stack of the currently running tasks at step 617. As described above, the control unit 300 is capable of controlling to display the stack in the sequential task selection operation (as shown in FIG. 2), direction task selection operation (as shown in FIG. 4), or focused task selection operation with a visual effect (as shown in FIG. 5).

The control unit 300 controls switching between the tasks to bring the application corresponding to the selected task to the foreground at step 619, and controls to display the execution screen of the new foreground application at step 621. For example, the control unit 300 is capable of controlling such that the execution window of the foreground application in full screen view or on top of the stack 500 of the tasks.

The above-described multitasking method and apparatus of a user device of the present invention can be implemented in the form of computer-executable program commands and stored in a non-transitory computer-readable storage medium. The computer readable storage medium may store the program commands, data files, and data structures in individual or combined forms. The program commands recorded in the storage medium may be designed and implemented for various embodiments of the present invention or used by those skilled in the computer software field.

As described above, the multitasking method and apparatus of the user device according to the present invention is capable of facilitating switching between a background task and a foreground task by reducing the manipulation steps and simplifying the user interaction. The multitasking method and apparatus of the present invention is also capable of intuitively and swiftly switching between the background and foreground applications.

The multitasking method and apparatus of the present invention is applicable to various types of devices. The multitasking method and apparatus of the present invention is capable of facilitating switch between background and foreground applications, thereby improving the usability and competitiveness of the user device and user convenience.

The computer-readable storage medium includes magnetic media such as a floppy disk and a magnetic tape, optical media including a Compact Disc (CD) ROM and a Digital Video Disc (DVD) ROM, a magneto-optical media such as a floptical disk, and the hardware device designed for storing and executing program commands such as ROM, RAM, and flash memory. The programs commands include the language code executable by computers using the interpreter as well as the machine language codes created by a compiler. The aforementioned hardware device can be implemented with one or more software modules for executing the operations of the various embodiments of the present invention.

While the invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. An electronic device, comprising:
    a touchscreen;
    a memory; and
    a processor electrically connected with the touchscreen and the memory, wherein the memory stores instructions that cause, when executed, the processor to control the electronic device to:
        receive a first touch input while a first task execution screen for a first task running on the electronic device is displayed on the touchscreen;
        based on receiving the first touch input, display a stack of partially overlaid visual elements on the touchscreen, wherein the visual elements in the stack respectively correspond to a plurality of tasks, including the first task, a visual element corresponding to the first task is on top of the stack, and each visual element includes a task execution screen image and identifier information for identifying the corresponding task;
        receive a second touch input for slidably moving one or more of the visual elements in the stack, while the stack is displayed;
        receive a third touch input for removing a visual element corresponding to a task from the stack;
        based on receiving the third touch input, remove the visual element corresponding to the task from the stack and adjust an interval between two consecutive visual elements of the visual elements remaining in the stack after removing the visual element corresponding to the task;
        receive a fourth touch input for selecting a visual element from the stack of partially overlaid visual elements; and
        based on receiving the fourth touch input, display, on the touchscreen, a second task execution screen for a second task corresponding to the selected visual element.

2. The electronic device of claim 1, wherein the instructions cause the processor to control the electronic device to determine an interval between two consecutive visual elements in the stack based on a number of visual elements displayed on the touchscreen.

3. The electronic device of claim 1, wherein the instructions cause the processor to control the electronic device to:
    determine an amount by which the visual elements in the stack are overlaid based on a number of visual elements displayed on the touchscreen.

4. The electronic device of claim 1, wherein the identifier information includes at least one of an icon and text.

5. A method for an electronic device, comprising:
    receiving a first touch input while a first task execution screen for a first task running on the electronic device is displayed on a touchscreen of the electronic device;
    based on receiving the first touch input, displaying a stack of partially overlaid visual elements on the touchscreen, wherein the visual elements in the stack respectively correspond to a plurality of tasks, including the first task, a visual element corresponding to the first task is on top of the stack, and each visual element includes a task execution screen image and identifier information for identifying the corresponding task;

receiving a second touch input for slidably moving one or more of the visual elements in the stack, while the stack is displayed;

receiving a third touch input for removing a visual element corresponding to a task from the stack;

based on receiving the third touch input, remove the visual element corresponding to the task from the stack and adjust an interval between two consecutive visual elements of the visual elements remaining in the stack after removing the visual element corresponding to the task;

receiving a fourth touch input for selecting a visual element from the stack of partially overlaid visual elements; and based on receiving the fourth touch input, displaying, on the touchscreen, a second task execution screen for a second task corresponding to the selected visual element.

6. The method of claim 5, further comprising:
determining an interval between two consecutive visual elements in the stack based on a number of visual elements displayed on the touchscreen.

7. The method of claim 5, further comprising:
determining an amount by which the visual elements in the stack are overlaid based on a number of visual elements displayed on the touchscreen.

8. The method of claim 5, wherein the identifier information includes at least one of an icon and text.

9. A non-transitory computer-readable medium storing instructions that, when executed by a processor of an electronic device, cause the processor to control the electronic device to at least:

receive a first touch input while a first task execution screen for a first task running on the electronic device is displayed on a touchscreen of the electronic device;

based on receiving the first touch input, display a stack of partially overlaid visual elements on the touchscreen, wherein the visual elements in the stack respectively correspond to a plurality of tasks, including the first task, a visual element corresponding to the first task is on top of the stack, and each visual element includes a task execution screen image and identifier information for identifying the corresponding task;

receive a second touch input for slidably moving one or more of the visual elements in the stack, while the stack is displayed;

receive a third touch input for removing a visual element corresponding to a task from the stack;

based on receiving the third touch input, remove the visual element corresponding to the task from the stack and adjust an interval between two consecutive visual elements of the visual elements remaining in the stack after removing the visual element corresponding to the task;

receive a fourth touch input for selecting a visual element from the stack of partially overlaid visual elements; and based on receiving the fourth touch input, display, on the touchscreen, a second task execution screen for a second task corresponding to the selected visual element.

10. The non-transitory computer-readable medium of claim 9, wherein the non-transitory computer-readable medium stores further instructions that, when executed by the processor of the electronic device, cause the processor to control the electronic device to:

determine an interval between two consecutive visual elements in the stack based on a number of visual elements displayed on the touchscreen.

11. The non-transitory computer-readable medium of claim 9, wherein the non-transitory computer-readable medium stores further instructions that, when executed by the processor of the electronic device, cause the processor to control the electronic device to:

determine an amount by which the visual elements in the stack are overlaid based on a number of visual elements displayed on the touchscreen.

12. The non-transitory computer-readable medium of claim 9, wherein the identifier information includes at least one of an icon and text.

* * * * *

UNITED STATES PATENT AND TRADEMARK OFFICE
CERTIFICATE OF CORRECTION

PATENT NO.        : 10,452,427 B2
APPLICATION NO.   : 15/790485
DATED             : October 22, 2019
INVENTOR(S)       : Park et al.

Page 1 of 1

It is certified that error appears in the above-identified patent and that said Letters Patent is hereby corrected as shown below:

In the Claims

Column 13, Line 10, Claim 5, change "remove" to --removing--.

Column 13, Line 12, Claim 5, change "adjust" to --adjusting--.

Signed and Sealed this
Eighteenth Day of August, 2020

Andrei Iancu
*Director of the United States Patent and Trademark Office*